Figure 1:
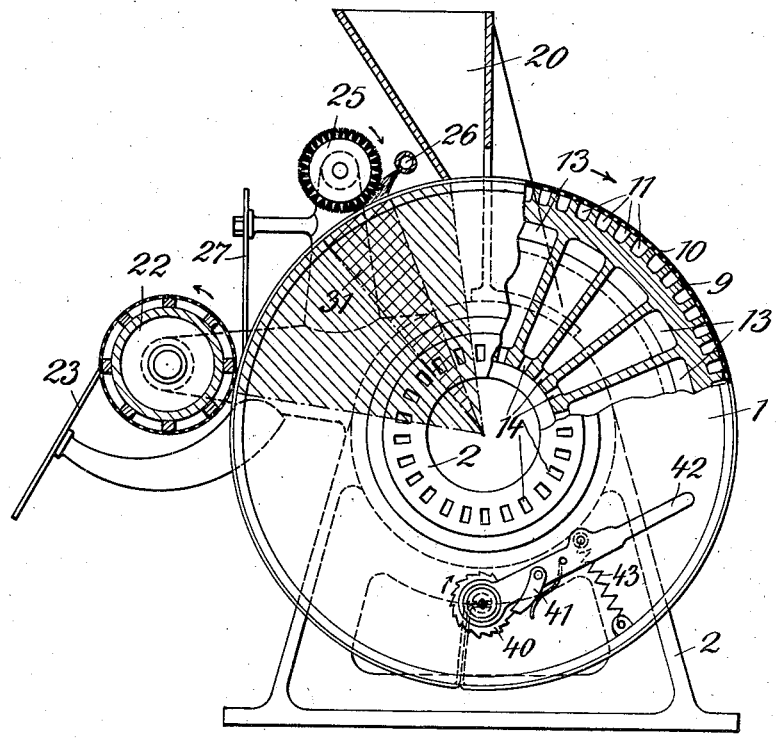

H. HENCKE.
VACUUM DRUM FILTER FOR SEPARATING SOLID SUBSTANCES FROM LIQUIDS.
APPLICATION FILED AUG. 31, 1907.

915,436.

Patented Mar. 16, 1909.
2 SHEETS—SHEET 1.

WITNESSES:
W. M. Avery
J. P. Davis

INVENTOR
Heinrich Hencke
BY
Munn & Co.
ATTORNEYS

H. HENCKE.
VACUUM DRUM FILTER FOR SEPARATING SOLID SUBSTANCES FROM LIQUIDS.
APPLICATION FILED AUG. 31, 1907.
915,436.
Patented Mar. 16, 1909
2 SHEETS—SHEET 2.
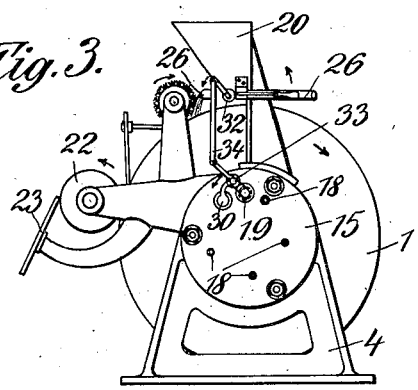
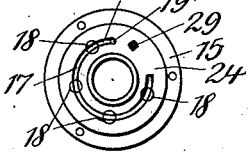
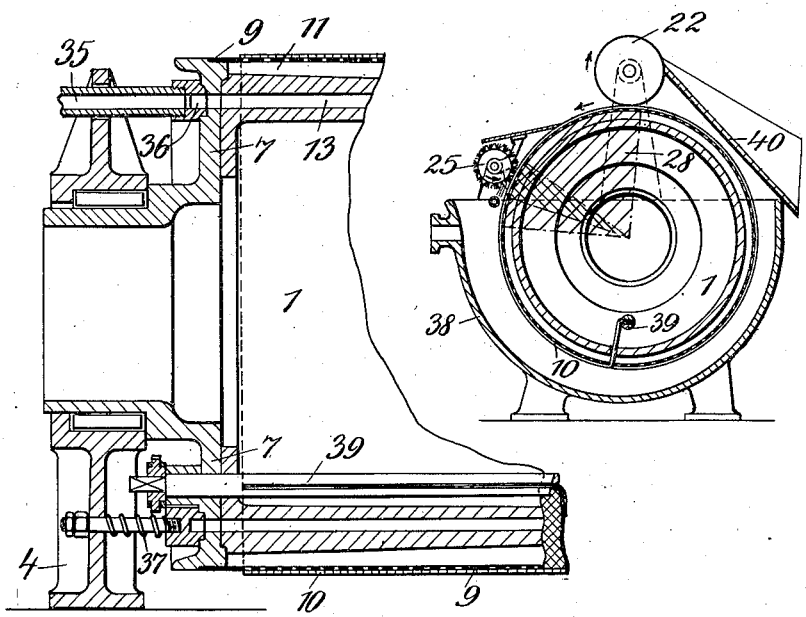
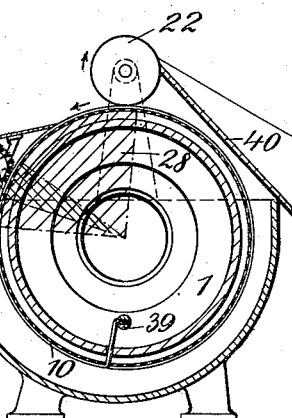
WITNESSES:
W. M. Avery
J. P. Davis
INVENTOR
Heinrich Hencke
BY Munn & Co.
ATTORNEYS

UNITED STATES PATENT OFFICE.

HEINRICH HENCKE, OF CHARLOTTENBURG, GERMANY.

VACUUM DRUM-FILTER FOR SEPARATING SOLID SUBSTANCES FROM LIQUIDS.

No. 915,436.　　　　Specification of Letters Patent.　　Patented March 16, 1909.

Application filed August 31, 1907. Serial No. 390,930.

*To all whom it may concern:*

Be it known that I, HEINRICH HENCKE, residing at Charlottenburg, near Berlin, in the Empire of Germany, Kantstrasse 38ª, a subject of the German Emperor, have invented certain new and useful Improvements Relating to Vacuum Drum-Filters for Separating Solid Substances From Liquids, of which the following is a specification.

The invention relates to a drum filter operating with a vacuum for separating solid substances from water and other liquids.

In known appliances the liquid is removed from the layer situated on the periphery of the drum and which is to be freed from moisture from the outside through the interior of the drum or through special drum passages at a suction place located at one of the ends of the drum. The result of this arrangement is that the portions of the drum or the chambers situated nearest to the suction place located on one side of the drum will yield up their liquid more readily or more completely than the more distant parts or chambers. With known devices there is therefore the difficulty that it is impossible to exert a uniform suction upon the drum or its chambers.

The object of the present invention is to render the production of such uniform suction possible. In accordance with the invention the suction of the liquid from the drum filter or its chambers is effected at a place located in the interior of the drum. By this means the result is attained that the suction effect is distributed more uniformly over the interior of the drum or its chambers and thus produces a more uniform and more effective suction. Naturally the suction will be rendered more uniform if the suction place arranged inside the drum is located approximately at its middle point. By this means the drum chambers are divided into two equal halves exposed to the same suction effect.

In order to prevent the liquid to be sucked from becoming dammed up, it is essential that the cross section of the drum chambers or their halves should widen out gradually or step by step toward the suction place. The collector conduit connected with the suction place and the suction pipe of the pump connected therewith, may in accordance with the invention be uninterruptedly horizontal or ascending. This presents the advantage that no air intervals or what are termed air pockets are able to form in the drum or in its chambers. This danger exists when the suction pipe of the pump is fitted at a point below the actual suction place. It has likewise proved to be advantageous to render the effective suction surface of the drum filter variable by the provision of suction chambers in the drum which can be rendered operative and inoperative. By this means a prejudicial suction of air at the beginning of operations can be avoided. With this object in accordance with the invention the effective suction area of the drum is gradually increased by the supply of the layer to be dehydrated in proportion to the movement of the drum. The parts of the drum which are not provided with a layer of material will not permit of the passage of air because they are not under suction.

The regulation of the drum chambers is preferably obtained by obturating members in a stationary passage communicating with the suction pipe of the pump and placed in communication with the chambers. When suction is to be produced upon the periphery of the drum, the passage is of course given a diameter corresponding to the periphery of the drum. This circumstance may be utilized for arranging a large number of obturators in the passage in order to facilitate the regulation and adaptation of the effective suction area of the drum to a progressive operation. The more numerous the subdivisions of the passage and consequently of the chambers, the smaller are the zones which are rendered operative in succession. The adjustability of the effective suction area of the drum also presents the further advantage that suction may be produced at the place at which the cleaning means, which may consist of a rotating brush with spraying pipe, acts. By this means the water sprayed by the pipe on to the periphery of the drum or onto the brush is prevented from reaching the layer which has already been freed more or less from its moisture. The arrangement may be such that the obturator for the spraying pipe is positively connected with an obturator in the suction pipe of the pump. By this means the result is attained that when the obturator of the spraying pipe is opened the obturator of the suction pipe is likewise opened and the surface of the drum in contact with the cleaning device is subjected to suction.

Figure 2:
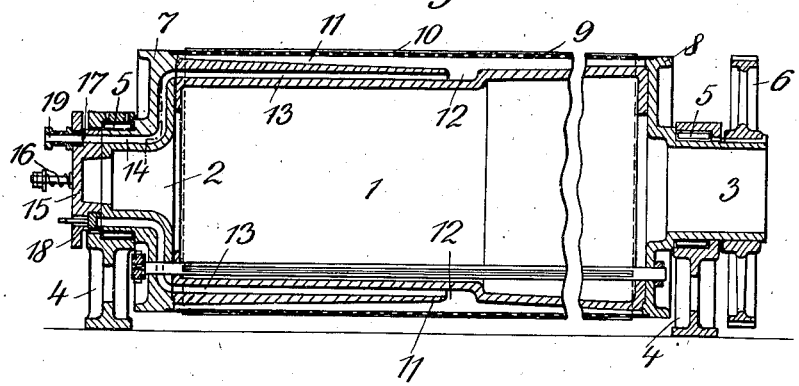

A drum filter in accordance with the invention is illustrated by way of example in the accompanying drawing, in which:

Figure 1 represents an end elevation of a constructional form of drum filter partly in section. Fig. 2 is a longitudinal section on a smaller scale. Fig. 3 is an end elevation of the drum filter viewed in the direction of the arrow shown in Fig. 2. Fig. 4 is a detail view of what is termed the suction head. Fig. 5 is a section of another constructional form with suction pipe arranged in proximity to the periphery of the drum. Fig. 6 shows in section a third constructional form which is substantially an inversion of the drum arrangement illustrated in Fig. 1.

In the construction represented in Fig. 1, the drum 1 rests by the intermediary of its hollow trunnions 2, 3 in the bearings 4 which may be provided with rollers 5 to decrease friction. The trunnion 3 carries the gear wheel 6 or a pulley. The drum 1 itself consists of the end walls 7, 8 between which the perforated periphery 9 is stretched. A permeable cloth 10 is laid on the periphery 9. The drum chamber located immediately beneath the parts 9, 10 is divided into chambers 11 as shown in Fig. 1. From these chambers 11, which present divided suction passages along the periphery of the drum, the liquid extracted from the material to be dehydrated is conducted to the exterior. In the example here illustrated a number of such chambers 11 are united to form a group which are subjected to suction simultaneously. The suction is produced from the interior of the drum. As shown in Fig. 2 the chambers 11 are provided approximately in the middle of the drum with a discharge aperture 12 to which the suction pipe is fitted. For each group of suction chambers 11 this consists of a passage 13 proceeding outward from the discharge aperture 12. As shown in Figs. 1 and 2 the passage 13 opens through the end wall 7 onto the outer side of the trunnion 2 in apertures 14. These apertures 14 are tightly closed by a cover 15 as shown in Figs. 2 and 3, pressure springs 16 being provided to render the joint as efficient as possible by pressing the cover against the trunnion 2 of the drum. The chambers 11 or their halves in accordance with Fig. 2 gradually widen out toward the discharge aperture 12 that is to say toward the suction place, so that the liquid cannot become dammed up.

The cover 15 is furnished with an annular passage 17 (Fig. 4). This annular passage may be subdivided by obturating members 18 into a number of compartments and communicates through a socket 19 with the suction pipe of the pump.

The operation of the arrangement illustrated in Fig. 1 is as follows. As soon as the introduction of the material to be freed from moisture from above through the hopper 20 begins, all the obturating bodies 18 are closed, so that as shown in Fig. 4 the compartment 21 of the passage is in communication with the socket 19. Accordingly the moisture is extracted only from that portion of the surface of the drum which corresponds to the section 21 of the passage. As the rotation of the drum 1 continues in proportion as the drum becomes provided with a layer of material, the obturating bodies 18 are opened, thus enlarging the passage 17 until finally the whole passage is in communication with the apertures 14 of the chambers 11. Owing to the fact that the moisture is sucked at the interior of the drum irregularities in the degree of dryness of the material treated are avoided, because the suction effect of the pump is distributed more uniformly over the entire length of the suction chambers. Naturally the action is most efficient when, as in Fig. 2 the suction place divides the suction chambers into two halves.

In the example here illustrated it is assumed that the suction effect is prevented from reaching the place at which the material is discharged. This non-suction is indicated in Fig. 1 by simple shade lines. The dried material is removed from the drum 1 by a small auxiliary cylinder 22 and conducted to the scraper 23 in the usual manner. In order to render the surface of the drum at the discharge place inoperative, as shown in Fig. 4 the annular passage is interrupted at 24, so that when the apertures 14 pass by this interruption 24 they are disconnected from the pump, so that the drum surface corresponding to the interruption 24 does not experience a suction effect.

Behind the discharge place for the material, a cleaning device is provided in a manner known *per se*. In the example here illustrated this device consists of a brush cylinder 25 and of a spraying pipe 26 parallel with the roller 25 and spraying water against the drum 1 and partly against the brush 25. A scraper 27 is arranged in front of the roller 25 and removes the coarser residue from the surface 10 of the drum. Now in order to prevent the water sprayed from the pipe 26 from reaching the layer of material which is already almost dry, the cleaning water is sucked off at the operative place of the cleaning device inside the inoperative zone 28. With this object, in the middle of the interruption 24 in the cover 15 a small slot 29 is provided which communicates with the suction socket 19, say by a branch pipe 30. When the mouths 14 of the passages 13 pass by, these mouths 14 are successively placed in communication with the slot 29 and the suction pipe 30, 19 so that the zone 31 of the drum 1 corresponding to the respective mouths 14 or the slot 29 exerts a suction effect.

The arrangement illustrated in Fig. 3 is such that when the obturator 32 of the spraying pipe 26 is open the slot 29 and the branch pipe 30 are also brought under the influence of the suction effect of the pump. With this object an obturator 33 is provided in the branch pipe 30 and as shown in Fig. 3 is positively connected by a rod 34 with the obturator 32 of the spraying pipe 26 in such a manner that when the obturator 32 is closed, 33 is closed likewise, and vice versa, when 32 is opened, 33 is also opened. This arrangement prevents air from being sucked at the zone 31 when the spraying pipe is not operative.

As with all pumping installations, it is here important that the suction pipe should be an up pipe, in order to prevent the formation of prejudicial air intervals or pockets. Accordingly in the constructional form illustrated in Fig. 5 the suction pipe 35 is arranged as close as possible to the periphery of the drum and approximately vertically over the axis of the drum. In the constructional form already described the passages 11, 13 open into a suction socket 19 which is at a lower level than the suction places. In the example illustrated in Fig. 5 on the other hand, the passages 13 are situated at the same distance from the middle of the drum as the suction socket 35. This socket 35 is fixed on an annular passage 36, which is preferably cut in the end wall 7 of the drum 1 and held on the bearing 4. In order to obtain a good joint between the annular passage and the wall of the drum in this case also, as shown in the drawing, pressure springs 37 are provided for pressing the passage 36 against the end wall 7.

In the example illustrated in Fig. 5, the passage 36 replaces the cover 15 of the constructional form already described. As in the said construction, here also the passage 36 might be subdivided into a number of compartments by obturating bodies in order to prevent the suction of air at the beginning of operations. In addition the passage 36 may be interrupted at one place in order that the suction effect may not be produced at the place at which the material is discharged. Owing to the fact that the annular passage 36 has approximately the same diameter as the drum itself, it is possible by providing a large number of obturators to adapt the effective suction area of the drum filter better to the progressive operation, as by this means an increased subdivision of the annular passage 36 and therefore of the drum chambers is rendered possible.

The construction illustrated in Fig. 6 is broadly an inversion of the drum filter shown in Fig. 1, as instead of the material to be treated being supplied from above it is here supplied from below or from the side from a vat 38 wholly or partially surrounding the drum 1. The material is discharged at a part of the drum surface at which no suction is exerted. As in the construction shown in Fig. 6 the cylinders 25 and 22 have changed places as compared with the construction in Fig. 1, in Fig. 6 the zone 31 is removed to the other side of the inoperative zone 38. Otherwise the operation of the chambers and of the drum cover, which is not shown again, is the same.

In the examples here illustrated, the drums are provided with a device for stretching the cloth covering 10 of the sieve. This stretching device consists of a rotatable tensioning shaft 39 arranged inside the drum and parallel with its axis and connected with the ends of the sieve cloth 10 in such a manner that by turning the shaft 39 greater or less tension may be imparted to the covering. This prevents the sieve cloth from becoming displaced on the drum 1 and permitting of premature displacement of the material placed upon it. Any displacements or extensions of the cloth, say owing to the heat of the material to be freed from moisture, may be compensated for at any time by the tensioning device. In accordance with Fig. 1 the shaft 39 is connected with a yielding tension device which automatically adapts the shaft to the contractions and extensions of the sieve cloth, and thus insures constant positive connection between the covering of the sieve and the tensioning shaft 39. With this object a ratchet wheel 40 is provided on the shaft 39 as shown in Fig. 1, its spring-controlled pawl 41 being displaceably mounted on a lever 42. This lever 42 is mounted loosely on the shaft 39 and its free end is connected with a tension spring 43, which at its other end is fixed to the plate 7 of the drum. It is obvious that when the ratchet mechanism 40, 41 is in engagement, it is impossible for the shaft 39 to rotate backward so that the sieve cloth 10 cannot become loose. On the contrary the spring 43 causes a permanent stretching of the cloth covering by rotating the shaft 39 in the direction indicated by the arrow in Fig. 1. Any extension of the cloth is thus compensated automatically. The ends of the cloth may be connected in any convenient manner with the shaft 39, say by means of clamping screws, insertion pieces or the like.

The details of the invention may be modified in various ways. This is especially the case as regards the construction of the auxiliary devices, such as the auxiliary suction cylinder, the cleaning device and so forth.

In the example illustrated in Fig. 1 it is assumed that the scraper 27 is arranged in close proximity to the auxiliary suction cylinder, so that the material removed by it may certainly be received by the auxiliary cylinder. Scrapers could, however, of course be provided at other places between the auxiliary suction cylinder and the cleaning cylinder. Instead of spraying water against the brush and against the surface of the drum, compressed air might be employed for cleaning the meshes of the sieve of the drum 1, by arranging along the cleaning brush 25 above the drum filter an air pipe provided with blowing openings. The tensioning device for the cloth covering of the sieve may of course be dispensed with if desired. Again, it is not absolutely necessary that the suction effect should be eliminated at the discharge place for the material; for instance this need not be done when a scraping device acts against the surface of the drum. The material to be treated may be supplied from above, from below or laterally of the drum as desired. The feeding devices such as hoppers or the like may be of any convenient kind and do not form an essential part of the invention. In the interior of the drum instead of one suction place, several such places might be provided for each drum chamber or group of chambers. The passage placing the suction place or places in communication with the place to which the suction pipe of the pump is fitted might extend over the entire length of the drum. The sieve of this drum filter may consist of any suitable material such as silk gauze, felt or similar filtering materials. The chambers might also be formed of extremely fine, almost blind sieves or walls of porous material such as kieselguhr, earthenware, wood, filter stone and the like. The drum filter may also be used in conjunction with a steam drying cylinder. The essential point is that in all cases the suction of the liquid from the interior of the drum or from the chambers of the drum should not take place as heretofore at one side on one of the ends of the drum but at a place located inside the suction drum.

What I claim and desire to secure by Letters Patent of the United States is:

1. In a vacuum filter, a drum provided with peripheral longitudinal cells having discharge openings at the longitudinal center of the drum, and with passages leading from the discharge openings out through an end of the drum and with which a suction pipe is adapted to be connected.

2. A vacuum filter for separating solids from liquids, comprising a revoluble drum provided with peripheral longitudinal cells, arranged in groups, a suction pipe, a connection between the groups of cells and suction pipe, the connection with the cells being at about their center of length and cut-offs in said connection whereby any desired number of cells can be placed in communication with th suction pipe.

3. A vacuum filter for separating solids from liquids, comprising a revoluble drum provided with peripheral cells having outlets at the longitudinal center of the drum, passages leading from the outlets of the cells through one of the trunnions of the drum, a cover at the end of the said trunnion and having a segmental passage, a suction pipe communicating with the passage, and obturating members in said segmental passage, whereby provision is made for successively placing the cells in communication with the suction pipe.

4. A vacuum filter for separating solids from liquids, comprising a revoluble drum provided with peripheral cells, passages leading from the cells through one of the trunnions of the drum, a cover at the end of the said trunnion and having a segmental passage, and a slot between the ends of the passage, a suction pipe communicating with the passage, a connection between the suction pipe and the said slot, obturating members in the segmental passage, and a water spraying device for the drum.

5. A vacuum filter for separating solids from liquids, comprising a revoluble drum having peripheral cells, passages leading from the cells through one of the trunnions of the drum, a cover at the end of the said trunnion and having a segmental passage, and a slot between the ends of the passage, a suction pipe communicating with the segmental passage, a valved connection between the suction pipe and the said slot, obturating members for the segmental passage, a water spraying device for the drum, a valved controlled spraying device, and a connection between the valves of the spraying device and the said connection whereby the said valve will be simultaneously operated.

6. A vacuum filter for separating solids from liquids, comprising a revoluble drum having peripheral cells, means whereby sundry of the cells may be successively connected in series with an exhaust apparatus to gradually increase the suction area of the drum as it revolves, a water supplying device at one side of the drum, and means, whereby the cells adjacent to the water supplying device are successively connected with the exhaust apparatus.

7. A vacuum filter, comprising a revoluble drum having peripheral cells, means whereby the cells may be successively connected with an exhaust apparatus, means whereby the cells at the discharge side of the drum are disconnected from the suction apparatus to form an inoperative zone, a water supplying device for supplying water to the inoperative zone of said drum, and means whereby sundry of the cells in the inoperative zone of the drum may be connected with the suction apparatus to draw off the water.

8. A vacuum filter for separating solids from liquids, comprising a revoluble drum having peripheral cells, means, whereby sundry of the cells may be successively connected in series with an exhaust apparatus, a valve controlled water spraying device for the drum, and means whereby the cells adjacent the water spraying device are successively connected with the exhaust apparatus, and means for controlling said valve whereby it will be opened at the time the cells are in communication with the exhaust apparatus.

In testimony whereof I have hereunto set my hand in the presence of two witnesses.

HEINRICH HENCKE.

Witnesses:
 PAUL ARRAS,
 CLÁRE SIMON.